US011879403B2

(12) United States Patent
Hayden et al.

(10) Patent No.: US 11,879,403 B2
(45) Date of Patent: Jan. 23, 2024

(54) METHOD AND SYSTEM FOR A MULTIVARIABLE ENGINE CONTROL USING CAM PHASING WITH A COMBINED HUMIDITY AND EXHAUST GAS RECIRCULATION (EGR) DILUTION VALUE TO SCHEDULE RESTRAINTS, AND DETERMINE A REFERENCE EGR SETPOINT

(71) Applicant: GM GLOBAL TECHNOLOGY OPERATIONS LLC, Detroit, MI (US)

(72) Inventors: David Nicholas Hayden, Howell, MI (US); Thomas E. Godward, South Lyon, MI (US); Ibrahim Riba, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 268 days.

(21) Appl. No.: 17/643,929

(22) Filed: Dec. 13, 2021

(65) Prior Publication Data
US 2023/0184185 A1 Jun. 15, 2023

(51) Int. Cl.
*F02D 41/00* (2006.01)
*F02D 41/24* (2006.01)
(Continued)

(52) U.S. Cl.
CPC ..... *F02D 41/0077* (2013.01); *F02D 13/0223* (2013.01); *F02D 41/0052* (2013.01);
(Continued)

(58) Field of Classification Search
CPC .............. F02D 41/0002; F02D 41/001; F02D 41/0072; F02D 41/0077; F02D 41/068; F02D 41/2416; F02D 41/2422; F02D 41/1401; F02D 2200/021; F02D 2200/0418; F02D 2200/0414; F02D 2200/703;
(Continued)

(56) References Cited

U.S. PATENT DOCUMENTS 9,534,547 B2 * 1/2017 Livshiz ............... F02D 13/0219
9,797,318 B2 * 10/2017 Storch ................. F02D 41/1402
(Continued)

*Primary Examiner* — Phutthiwat Wongwian
*Assistant Examiner* — Sherman D Manley
(74) *Attorney, Agent, or Firm* — Lorena & Kopf LLP

(57) ABSTRACT

In exemplary embodiments, methods, and systems for multivariable torque control of a vehicle are provided. The method includes configuring a processor disposed of in a multivariable controller to determine a set of references associated with Exhaust Gas Recirculation (EGR) by implementing an algorithm based on engine temperature and at least one reference associated with the EGR to generate commands for the control of a set of actuators; Optimizing at least one cam phase position by the control based on a generated command to apply an appropriate level of engine torque for vehicle propulsion; Restricting an allowable range of cam phases associated with operations of an EGR valve for a set of cams based on amounts of humidity and EGR introduced by the EGR valve during an internal combustion phase of vehicle operation; and providing an amount of propulsion torque by an engine in accordance with instructions provided by the processor.

20 Claims, 7 Drawing Sheets

(51) Int. Cl.
*F02D 13/02* (2006.01)
*F02D 41/06* (2006.01)

(52) U.S. Cl.
CPC ....... *F02D 41/0072* (2013.01); *F02D 41/068* (2013.01); *F02D 41/2416* (2013.01); *F02D 41/2422* (2013.01); *F02D 2200/021* (2013.01); *F02D 2200/0418* (2013.01); *F02D 2250/18* (2013.01)

(58) Field of Classification Search
CPC ............. F02D 2250/18; F02D 13/0261; F02D 13/0207; F02D 13/0219; Y02T 10/40
USPC ......................................................... 123/568
See application file for complete search history.

(56) References Cited

U.S. PATENT DOCUMENTS

| | | | | |
|---|---|---|---|---|
| 2008/0059049 A1* | 3/2008 | Totten | ..................... | F02P 5/04 |
| | | | | 701/105 |
| 2014/0109568 A1* | 4/2014 | Glugla | ................ | F02D 41/0007 |
| | | | | 60/599 |
| 2014/0109870 A1* | 4/2014 | Glugla | ................ | F02M 35/088 |
| | | | | 123/406.11 |
| 2014/0109871 A1* | 4/2014 | Glugla | ................. | F02P 5/1504 |
| | | | | 123/406.19 |
| 2018/0216563 A1* | 8/2018 | Whitney | ................. | F02D 43/04 |
| 2018/0230864 A1* | 8/2018 | Whitney | ............. | F02D 41/2422 |
| 2018/0274473 A1* | 9/2018 | Levijoki | ............. | F02D 41/2409 |
| 2019/0048813 A1* | 2/2019 | Dudar | ................. | F02D 41/0087 |
| 2023/0054131 A1* | 2/2023 | Sukegawa | ........... | F02D 41/1498 |

* cited by examiner

METHOD AND SYSTEM FOR A MULTIVARIABLE ENGINE CONTROL USING CAM PHASING WITH A COMBINED HUMIDITY AND EXHAUST GAS RECIRCULATION (EGR) DILUTION VALUE TO SCHEDULE RESTRAINTS, AND DETERMINE A REFERENCE EGR SETPOINT

INTRODUCTION

The technical field generally relates to internal combustion engines, and more particularly to a system and method for multivariable engine control using cam phasing with a combined humidity and EGR dilution value while implementing scheduled cam phaser references and constraints and reference EGR setpoints to optimize engine performance.

The exhaust gas recirculation (EGR) valve recirculates quantities of exhaust gas to the engine intake system for increased engine efficiency, reduced fuel consumption, and lower NOx emissions. Engine control systems have been developed to control engine output torque to achieve the desired torque. Traditional engine control systems, however, do not control the engine output torque as accurately as desired by failing to account for or take other variables associated with external humidity and dilution of intake air into sufficient consideration that affects intake mixtures and can reduce engine performance. Further, traditional engine control systems do not provide a rapid response to control signals or coordinate engine torque control among various devices that affect the engine output torque.

Accordingly, it is desirable to provide improved methods and systems for a multivariable engine control system that has control over one or more cam phasers and an EGR valve, to introduce scheduled constraints in cam phaser operations, and to maintain acceptable combustion stability across varying EGR and ambient humidity operating conditions.

Accordingly, it is desirable to provide improved methods and systems for a variable engine control system that controls a set of cam phasers including intake and exhaust cams in combination with external EGR for enhancing the control of the internal combustion engine; and simplifying a plurality of effects caused by the humidity and EGR into a single value for use in generating at least one command to restrict operations of one or more cam phasers.

Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method for multivariable torque control of a vehicle is provided.

The method includes configuring a processor disposed of in a multivariable controller and programmed with a set of instructions to determine a set of references associated with Exhaust Gas Recirculation (EGR); implementing, by the processor, an algorithm based on engine temperature and at least one reference that is determined of the set of references associated with the EGR to generate one or more commands for the control of a set of actuators; optimizing, by the processor, at least one cam phase position by the control based on a generated command to at least one actuator of the set of actuators to apply an appropriate level of engine torque for vehicle propulsion; restricting, by the processor, an allowable range of cam phases associated with operations of an EGR valve for a set of cams based on amounts of humidity and EGR introduced by the EGR valve during an internal combustion phase of vehicle operation; and providing an amount of propulsion torque by an engine of the vehicle in accordance with instructions provided by the processor.

In at least one exemplary embodiment, the method further includes using, by the processor, the set of cam phasing comprising intake and exhaust cams in combination with external EGR for enhancing the control of an internal combustion engine; and simplifying by the processor a plurality of effects caused by the humidity and EGR into a single value for use in generating at least one command to restrict operations of one or more cam phasers.

In at least one exemplary embodiment, the method further includes combining, by the processor, values of the humidity and EGR into a single dilution value, as a basis to schedule the set of cam phaser constraints.

In at least one exemplary embodiment, the method further includes tuning, by the processor, the values of the set of cam phaser constraints to optimize the engine performance while protecting against poor combustion stability.

In at least one exemplary embodiment, the method further includes wherein a value for an EGR reference is based on one or more values contained in a set of calibration tables of at least a high barometric value and a low barometric pressure value.

In at least one exemplary embodiment, the method further includes adjusting, by the processor, the EGR reference based on a set of values associated with the humidity, engine coolant, and air temperature.

In at least one exemplary embodiment, the method further includes tuning, by the processor, a coefficient for adjusting the value of the EGR reference based on the set of values associated with the humidity, the engine coolant, and the air temperature.

In at least one exemplary embodiment, the method further includes wherein the dilution value further includes using a current dilution value, by the processor, as an input to interpolate between a set of dilution values including low dilution values, nominal dilution values, and maximum dilution values and a corresponding set of calibration tables to determine a set of phaser constraints including an intake phaser maximum advance constraint, an intake phaser maximum retard constraint, an exhaust phaser maximum advance constraint, and an exhaust phaser maximum retard constraint.

In at least one exemplary embodiment, the method further includes in response to a high level of humidity, reducing, by the processor, an amount of the EGR in order to maintain a constant value for the dilution value.

In at least one exemplary embodiment, the method includes controlling by the processor, operating of the EGR valve by calculating, by the processor, a percentage value of the EGR reference that is used as the basis for a target setpoint; determining, by the processor, based on the values contained in the set of calibration tables, the percentage value of the EGR reference at low barometric pressure, and at high barometric pressure; applying, by the processor, the set of values associated with barometric pressure that is measured and using an interpolate function to determine the set of values from the set of calibration tables on which an initial percentage value of the EGR reference is determined; and adjusting, by the processor, the percentage value of the EGR reference in accordance with a current humidity by using a linear relationship function between the values of the current humidity and the percentage value associated with an EGR reduction.

In at least one exemplary embodiment, the method includes using a set of cam phaser values from a first, a second, and a third set of cam phaser calibration tables including a first calibration table containing cold cam phaser values, a second calibration table containing warm cam phaser values, and a third calibration table containing EGR cam phaser values; blending during the engine warmup, a cold-warm scaler blend containing the values between zero to one wherein the values of the cold-warm scaler blend provide the basis to apply the interpolate function between the cold cam phaser values and the warm cam phaser table values; further blending as EGR is introduced including calculating the value for an EGR blend factor by dividing a final percentage EGR reference by a nominal percentage value of the EGR reference that corresponds to the current humidity. The EGR blend factor provides a basis to apply the interpolate function between the warm cam phaser values and the EGR cam phaser values; and generating the set of values as reference target values that correspond to cam phaser commands for providing the amount of propulsion torque by the engine of the vehicle in accordance with instructions provided by the processor.

In another exemplary embodiment, a system for multivariable torque control of a vehicle is provided. The system includes an engine; and a processor disposed of in a multivariable controller that is coupled to the engine and configured to: determine a set of references associated with Exhaust Gas Recirculation (EGR); implement an algorithm based on an engine temperature and at least one reference that is determined of the set of references associated with the EGR to generate one or more commands for the control of a set of actuators; optimize at least one cam phase position by the control based on a generated command to at least one actuator of the set of actuators to apply an appropriate level of engine torque for vehicle propulsion; restrict an allowable range of cam phases associated with EGR valve operations for a set of cams based on amounts of humidity and EGR introduced by the EGR valve during an internal combustion phase of vehicle operation; and provide an amount of propulsion torque by the engine of the vehicle in accordance with instructions provided by the processor.

In at least one exemplary embodiment, the system further includes wherein the processor is further configured to use the set of cam phasing including intake and exhaust cams in combination with external EGR for enhancing the control of the internal combustion engine; simplify a plurality of effects caused by the humidity and EGR into a single value for use to generate at least one command to restrict operations of one or more cam phasers.

In at least one exemplary embodiment, the system includes wherein the processor is further configured to combine values of the humidity and EGR into a single value for a dilution value, as a basis to schedule the set of cam phaser constraints.

In at least one exemplary embodiment, the system includes wherein the processor is further configured to tune values of the set of cam phaser constraints to optimize engine performance while protecting against poor combustion stability wherein a value for an EGR reference are based on one or more values contained in a set of calibration tables of at least a high barometric value and a low barometric pressure value.

In at least one exemplary embodiment, the system includes wherein the processor is further configured to adjust the EGR reference based on a set of values associated with the humidity, engine coolant, and air temperature.

In at least one exemplary embodiment, the system includes wherein the processor is further configured to use a current dilution value as input to interpolate between a set of dilution values including low dilution values, nominal dilution values, and maximum dilution values and a corresponding set of calibration tables to determine a set of phaser constraints including an intake phaser maximum advance constraint, an intake phaser maximum retard constraint, an exhaust phaser maximum advance constraint, and an exhaust phaser maximum retard constraint.

In at least one exemplary embodiment, the system includes wherein the processor is further configured to: in response to a high level of humidity, reduce an amount of the EGR in order to maintain a constant value for the dilution value.

In at least one exemplary embodiment, the system includes wherein the processor is further configured to: control the EGR valve by performing a set of actions to: calculate a percentage value of the EGR reference that is used as the basis for a target setpoint; determine based on values contained in the set of calibration tables, the percentage value of the EGR reference at low barometric pressure, and at high barometric pressure; apply the set of values associated with barometric pressure that is measured and use an interpolate function to determine the set of values from the set of calibration tables on which an initial percentage value of the EGR reference is determined; and adjust the percentage value of the EGR reference in accordance with a current humidity by using a linear relationship function between the values of the current humidity and the percentage value associated with an EGR reduction.

In at least one exemplary embodiment, the system includes wherein the processor is further configured to: use a set of cam phaser values from a first, a second, and a third set of cam phaser calibration tables including a first calibration table containing cold cam phaser values, a second calibration table containing warm cam phaser values, and a third calibration table containing EGR cam phaser values; blend during the engine warmup, a cold-warm scaler blend containing values between zero to one wherein the values of the cold-warm scaler blend provide the basis to apply the interpolate function between the cold cam phaser values and the warm cam phaser table values; further blend as EGR is introduced including calculating the value for an EGR blend factor by dividing a final percentage EGR reference by a nominal percentage value of the EGR reference that corresponds to the current humidity. The EGR blend factor provides a basis to apply the interpolate function between the warm cam phaser values and the EGR cam phaser values; and generate the set of values as reference target values that correspond to cam phaser commands for providing the amount of propulsion torque by the engine of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
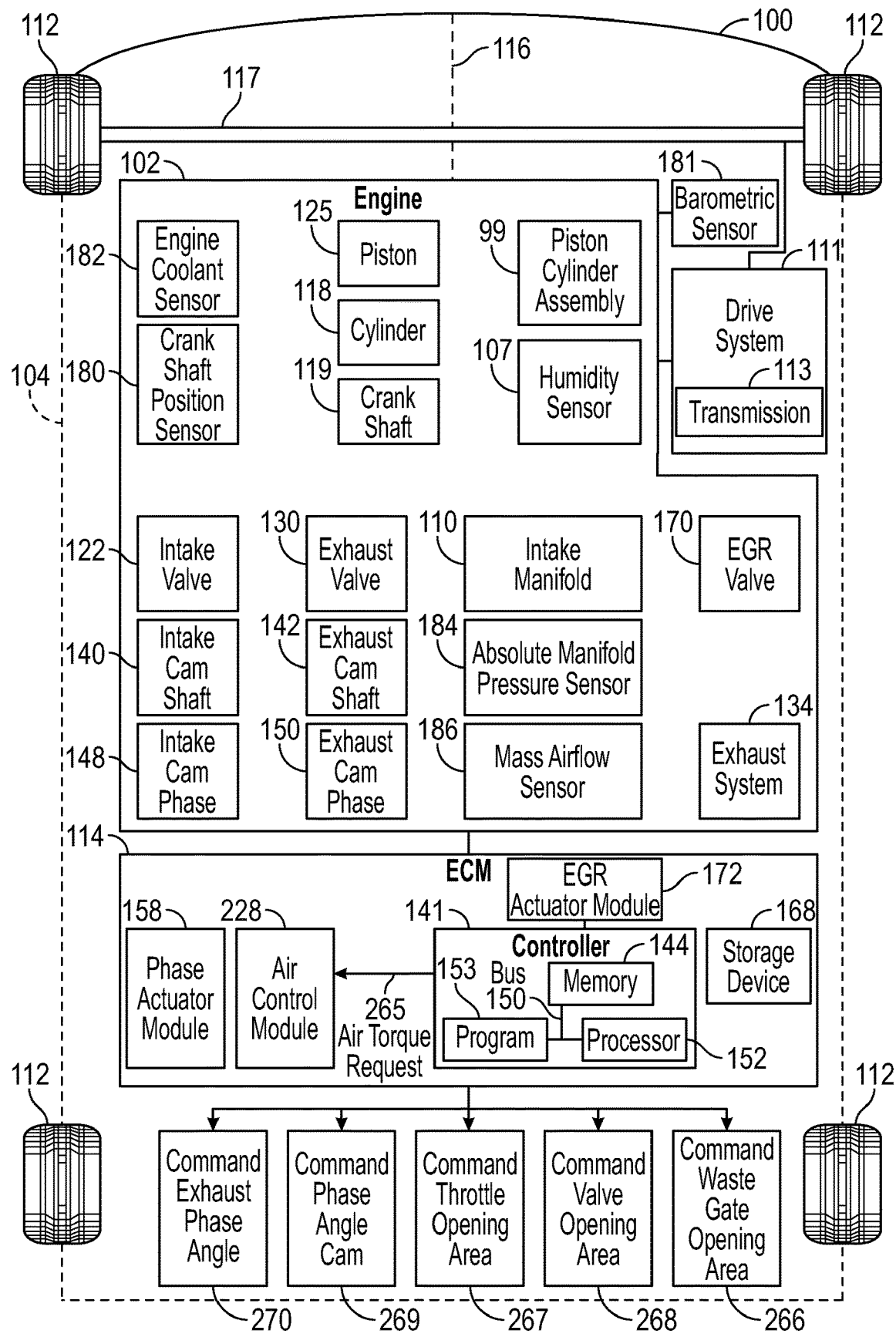
FIG. 1 illustrates an exemplary diagram of a vehicle that includes a multivariable torque control system and other components of a propulsion system, various actuators responsive to commands to control the intake and exhaust cams of a vehicle controller in accordance with various embodiments.

The use of intake and/or exhaust cam phasing on internal combustion engines allows for more control which has the benefits of optimum engine performance, increased fuel efficiency, and reduced emissions. However, during certain ambient conditions, the amount of cam overlap that can be used needs to be limited based on the amount of ambient humidity to maintain good combustion stability. To achieve the optimum amount of overlap, the humidity of the induction air can be measured or estimated. This humidity combined with an EGR dilution value is then used to create a set of cam position constraints that can be tuned to optimize engine performance while protecting against poor combustion stability FIG. 1 illustrates a vehicle 100, according to an exemplary embodiment. As described in greater detail further below, the vehicle 100 includes an engine control module (ECM) 114 that is configured for multivariable torque control for restricting cam phaser operations by analyzing effects caused by humidity and EGR on combustion to maximize engine performance, and stability, of the vehicle 100 in accordance with exemplary embodiments.

In various embodiments, vehicle 100 includes an automobile. The vehicle 100 may be any one of a number of different types of automobiles, such as, for example, a sedan, a wagon, a truck, or a sport utility vehicle (SUV), and maybe two-wheel-drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also include a motorcycle or other vehicle, such as aircraft, spacecraft, watercraft, and so on, and/or one or more other types of mobile platforms (e.g., a robot and/or other mobile platforms).

Vehicle 100 includes body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 111 is mounted on the chassis 116, and drives the wheels 112, for example via axles 117. In various embodiments, the drive system 111 includes an engine 102 that drives the wheels 112 via the axles 117, and that also provides propulsion torque for automatic braking of the vehicle 100. In certain embodiments, engine 102 includes a combustion engine. In various other embodiments, one or more other types of engines 102 may also be included, such as a hybrid electric/combustion engine, and/or one or more other different types of engines.

Also as depicted in various embodiments, the drive system 111 includes a transmission 113. In various embodiments, the transmission 113 can be automatically and/or manually shifted into different gears, such as drive (D), park (P), reverse (R), and so on.

In various embodiments, the vehicle 100 also includes a combustion engine 102 that includes a piston 125. During the combustion stroke, the combustion of the air/fuel mixture drives the piston 125 away from Top Dead Center (TDC), thereby driving the crankshaft 119. Thus, the crankshaft 119 is rotatable to provide drive torque to propel the motor vehicle, wherein the piston-cylinder assembly 99 is configured to combust the air/fuel mixture to rotate the crankshaft 119. The combustion stroke may be defined as the time between the piston 125 reaching TDC and the time at which piston 125 reaches a bottom dead center (BDC).

During the exhaust stroke, the piston 125 begins moving away from BDC and expels the products of combustion (exhaust gases) through an exhaust valve 130. Thus, the exhaust valve 130 is configured to expel the exhaust gases from the piston-cylinder assembly 99. The products of combustion are exhausted from the vehicle through an exhaust system 134.

The intake valve 122 is controlled by an intake camshaft 140, while the exhaust valve 130 is controlled by an exhaust camshaft 142. Thus, the intake camshaft 140 is configured to be rotated to control the intake valve 122, and the exhaust camshaft 142 is configured to be rotated to control the exhaust valve 130. It should be understood that the intake camshaft 140 or multiple intake camshafts 140 will typically control a plurality of intake valves 122 associated with one or more cylinders 118 in one or more cylinder banks.

Likewise, the exhaust camshaft 142 or multiple exhaust camshafts 142 will typically control a plurality of exhaust valves 130 associated with one or more cylinders 118 in one or more cylinder banks. It should also be understood that the intake valve 122 and/or the exhaust valve 130 may be controlled by devices other than camshafts, such as cam-less valve actuators.

The time when the intake valve 122 is opened and closed with respect to piston TDC is varied by an intake cam phaser 148. For example, the intake cam phaser 148 may be configured to control the rotation of the intake camshaft 140 by controlling an intake cam phase angle of the intake camshaft 140. Correspondingly, the time when the exhaust valve 130 is opened and closed with respect to piston 125 Top Dead Center (TDC) is varied by an exhaust cam phaser 150. The exhaust cam phaser 150 may be configured to control the rotation of the exhaust camshaft 142 by controlling an exhaust cam phase angle of the exhaust camshaft 142. A phaser actuator module 158 controls the intake cam phaser 148 and the exhaust cam phaser 150 based on signals from the Engine Control Module (ECM) 114. Optionally, a variable valve lift may also be controlled by the phaser actuator module 158.

The propulsion system (i.e., engine 102 and exhaust system 134) of vehicle 100 also includes an exhaust gas recirculation (EGR) valve 170, which is configured to selectively redirect a portion of the exhaust gases back to the intake manifold 110 through a selectively variable EGR valve opening area. The EGR valve 170 is controlled by an EGR actuator module 172 based on signals from the ECM 114.

Engine 102 further includes a humidity sensor 107. The humidity sensor may detect a water vapor concentration of air entering the intake manifold 110 via intake passage. The humidity sensor 107 may be positioned downstream of an EGR valve 170 but upstream of the intake valve 122. A relative humidity reading generated by the humidity sensor is indicative of the humidity of fresh air or a combination of fresh air and recirculated exhaust air, based on the position of EGR valve 170.

The position of the crankshaft 119 is measured using a crankshaft position sensor 180. The rotational speed of the crankshaft 119, which is also the rotational speed of the engine 102, may be determined based on the crankshaft position. The temperature of the engine coolant is measured by an engine coolant temperature (ECT) sensor 182. The ECT sensor 182 is preferably located within engine 102 or at another location where the coolant is circulated, such as a radiator.

The pressure within the intake manifold 110 is measured using a manifold absolute pressure (MAP) sensor 184. Optionally, the engine vacuum, which is the difference between ambient air pressure and the pressure within the intake manifold 110, may be measured. The mass flow rate of air flowing into the intake manifold 110 is measured using a mass airflow (MAF) sensor 186.

In FIG. 1, the Command values, or target values, for airflow-controlling engine actuators are determined based on the air torque request. More specifically, based on the air torque request 265, the air control module 228 determines a commanded wastegate opening area 266, a commanded throttle opening area 267, a commanded EGR valve opening area 268, a commanded intake cam phase angle 269, and a commanded exhaust cam phase angle 270 using model predictive control.

In various embodiments, the Engine Control Module (ECM) 114 includes a controller (or computer system) 141 that controls vehicle operation including utilizing propulsion torque provided by the engine 102 in accordance with instructions provided thereto by the controller 141, based on processing performed by the controller 141 utilizing the sensor data and other data and/or information obtained via the ECM 114.

The ECM 114 receives input from an atmospheric (i.e., barometric) sensor 181 to determine the air pressure of the ambient air in or around the vehicle uses this input in part to adjust air/fuel ratio and ignition timing for changing altitude conditions (and thus the density of the air entering the engine 102).

In various embodiments, the controller 141 (and, in certain embodiments, is disposed within a body of the vehicle 100. It will be appreciated that controller 141 may otherwise differ from the embodiment depicted in FIG. 1. For example, controller 141 may be coupled to or may otherwise utilize one or more remote computer systems and/or other control systems, for example as part of one or more of the above-identified vehicle 100 devices and systems.

In the depicted embodiment, the computer system of the controller 141 includes a computer system (also referred to herein as a computer system) and includes a processor 152, a memory 144, a storage device 168, and a computer bus 150. The processor 152 performs the computation and control functions of the controller 141 and may include any type of processor or multiple processors, single integrated circuits such as a microprocessor, or any suitable number of integrated circuit devices and/or circuit boards working in cooperation to accomplish the functions of a processing unit. During operation, the processor 152 executes one or more programs 153 contained within the memory 144 and, as such, controls the general operation of the controller 141 and the computer system of the controller 141, generally, in executing the processes described with respect to FIGS. 2-7.

The memory 144 can be any type of suitable memory. For example, memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 152.

The bus 150 serves to transmit programs, data, status, and other information or signals between the various components of the computer system of the controller 141 and an interface (not shown) allows communication to the computer system of the controller 141, for example from a system driver and/or another computer system and can be implemented using any suitable method and apparatus.

The storage device 168 can be any suitable type of storage apparatus, including different types of direct access storage and/or other memory devices. In one exemplary embodiment, the storage device 168 includes a program product from which memory 144 can receive a program 153 that executes one or more embodiments of one or more processes of the present disclosure, such as described with respect to FIGS. 2-7.

The bus 150 can be any suitable physical or logical means of connecting computer systems and components. This includes, but is not limited to, direct hard-wired connections, fiber optics, infrared, and wireless bus technologies. During operation, program 153 is stored in memory 144 and executed by the processor 152.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal-bearing media used to store the program and the instructions thereof and carry out the distribution thereof, such as a non-transitory computer-readable medium bearing the program and containing computer instructions stored therein for causing a computer processor (such as the processor 152) to perform and execute the program.

Such a program product may take a variety of forms, and the present disclosure applies equally regardless of the particular type of computer-readable signal-bearing media used to carry out the distribution. Examples of signal-bearing media include recordable media such as floppy disks, hard drives, memory cards, and optical disks, and transmission media such as digital and analog communication links. It will be appreciated that cloud-based storage and/or other techniques may also be utilized in certain embodiments. It will similarly be appreciated that the computer system of the controller 141 may also otherwise differ from the embodiment depicted in FIG. 1 for example in that the computer system of the controller 141 may be coupled to or may otherwise utilize one or more remote computer systems and/or other control systems.

Figure 2:
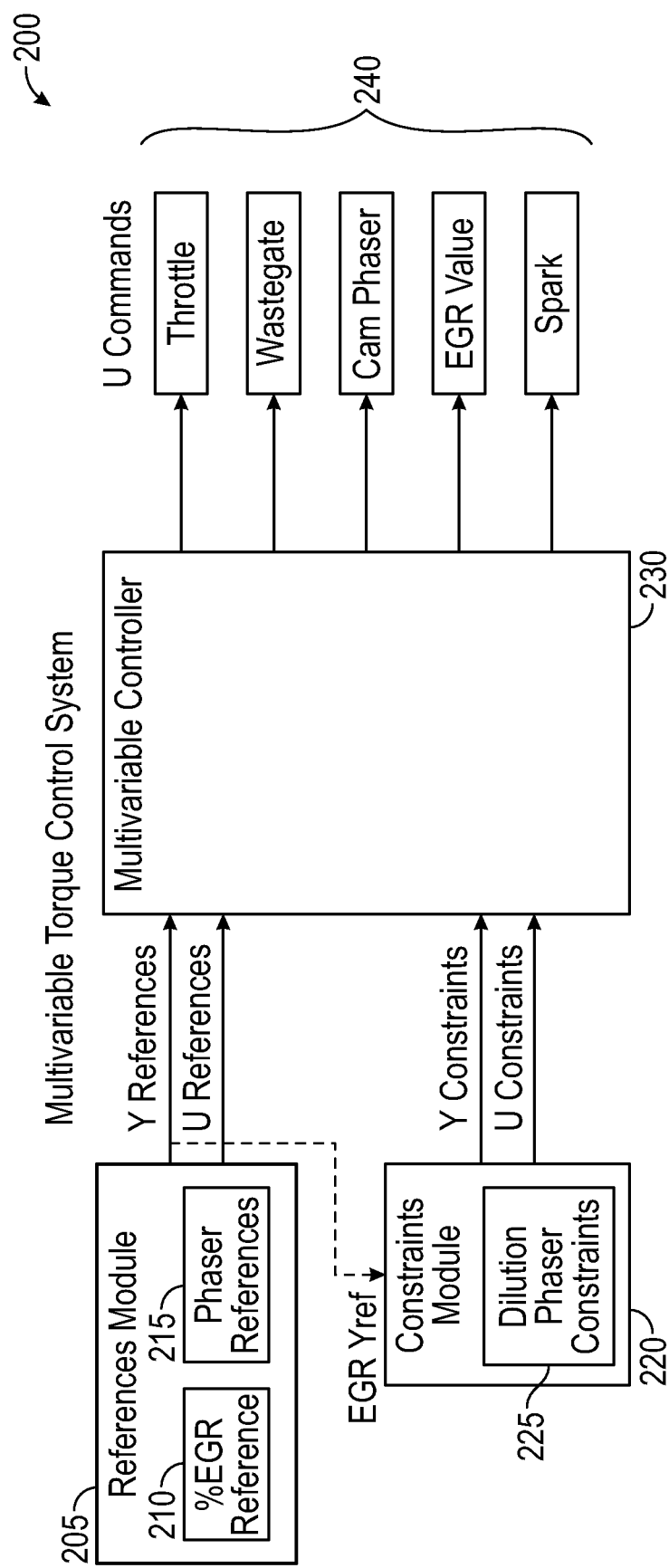
FIG. 2 illustrates an exemplary functional block diagram of a vehicle that includes a multivariable torque control system for restricting cam phaser operations by analyzing effects caused by humidity and EGR on combustion to maximize engine performance and stability, and that determines the optimal cam phase positions by issuing various commands for cam phaser operations in accordance with various exemplary embodiments.

FIG. 2 illustrates an exemplary diagram of a multivariable torque control system that determines the optimal cam phase positions by issuing various commands for cam phaser operations in accordance with exemplary embodiments. In FIG. 2, there is shown a set of references of reference module 205 that includes a percentage EGR reference module 210 to generate a set of signals indicative of percentage values associated with EGR references and a set of phaser reference modules to generate a set of signals associated with values for phaser references.

In embodiments, the set of references of reference module 205 generate Y and U references to be sent to a multivariable controller 230 that implements an algorithm using a processor that uses in part the Y and U references for EGR percentage references (i.e., EGR $Y_{ref}$) combined with Y and U constraints generated by a constraints module 220 to issue a set of U commands 240. The U commands 240 include (though not implemented) commands for actions associated with the throttle, wastegate, cam phasers, EGR valve, and spark components.

In embodiments, the reference module 205 calculates a percentage value for the EGR reference via the percentage EGR module 210 in which a percentage EGR reference value is calculated and used in the multivariable control system as a target setpoint. The calibration tables include values for percentage EGR reference at low and high barometric pressure and the measured barometric pressure is used to interpolate by the EGR reference module 210 between these tables to determine the initial percentage EGR reference. The percentage EGR reference is adjusted for current humidity using a linear relationship between humidity and percentage EGR reduction.

The constraint module 220 implements a set of dilution phaser constraints 225 that issues a set of constraints in operations of one or more cam phasers via the multivariable controller 230. In embodiments, the dilution phaser constraints 225 include control over one or more cam phasers. In embodiments, constraint module 220 implements a process that combines the humidity and EGR levels into a single dilution value, which is used to schedule cam phaser constraints. The dilution phaser constraints are based on three dilution setpoints: Low Dilution=$k_1$*Low Humidity+$k_2$*Zero EGR, Nominal Dilution=$k_1$*High Humidity+$k_2$*Nominal EGR at High Humidity, Max Dilution=$k_1$*High Humidity+$k_2$*Max EGR at High Humidity. Each dilution setpoint has a corresponding set of cam phaser maximum advance and maximum retard constraint tables. A Current Dilution value is calculated ($k_1$*Humidity+$k_2$*EGR) and used to interpolate between the three sets of constraint tables. The outputs of the constraint tables are applied as constraints to the multivariable controller 230. The cam phaser constraints (generated by the constraints module 220) can be tuned to optimize engine performance while protecting against poor combustion stability.

In embodiments, the phaser reference module 215 determines the optimal cam phaser positions as a function of engine temperature and EGR fraction. The phaser reference module 215 uses a set of multiple (i.e., three or more) cam phaser calibration tables that includes calibration tables containing cold, warm, and with EGR values to determine the U commands 240 for the optimal phaser position.

In embodiments, during the engine warmup phase, the phaser reference module 215 processes cold-warm scaler blends from 0 to 1 which are used to apply an interpolation or estimation function between a set of values contained in the cold and warm cam phaser calibration tables. Once the Cold-Warm Scaler has reached 1, an EGR blend factor is used to interpolate between the Warm and With EGR cam phaser tables. The EGR blend factor is calculated by dividing the final % EGR reference by the Nominal % EGR reference at the current humidity.

In embodiments, the multivariable controller 230 implements a multivariable engine torque/airflow control using a percentage value of EGR Reference calculated (from the reference module 205) and which is received as input to determine the actuator position commands for the engine. This EGR reference (Y, U references) is based on values derived from calibration tables for high and low barometric pressure values, and adjustments that are made for humidity, engine coolant, and air temperature. The humidity adjustment uses a simple formula to reduce EGR by a coefficient multiplied by the change in humidity. The effects that EGR and humidity have on combustion are similar but of different magnitude. The coefficient can be tuned to maintain constant effective dilution by changing EGR as a function of humidity.

Figure 3:
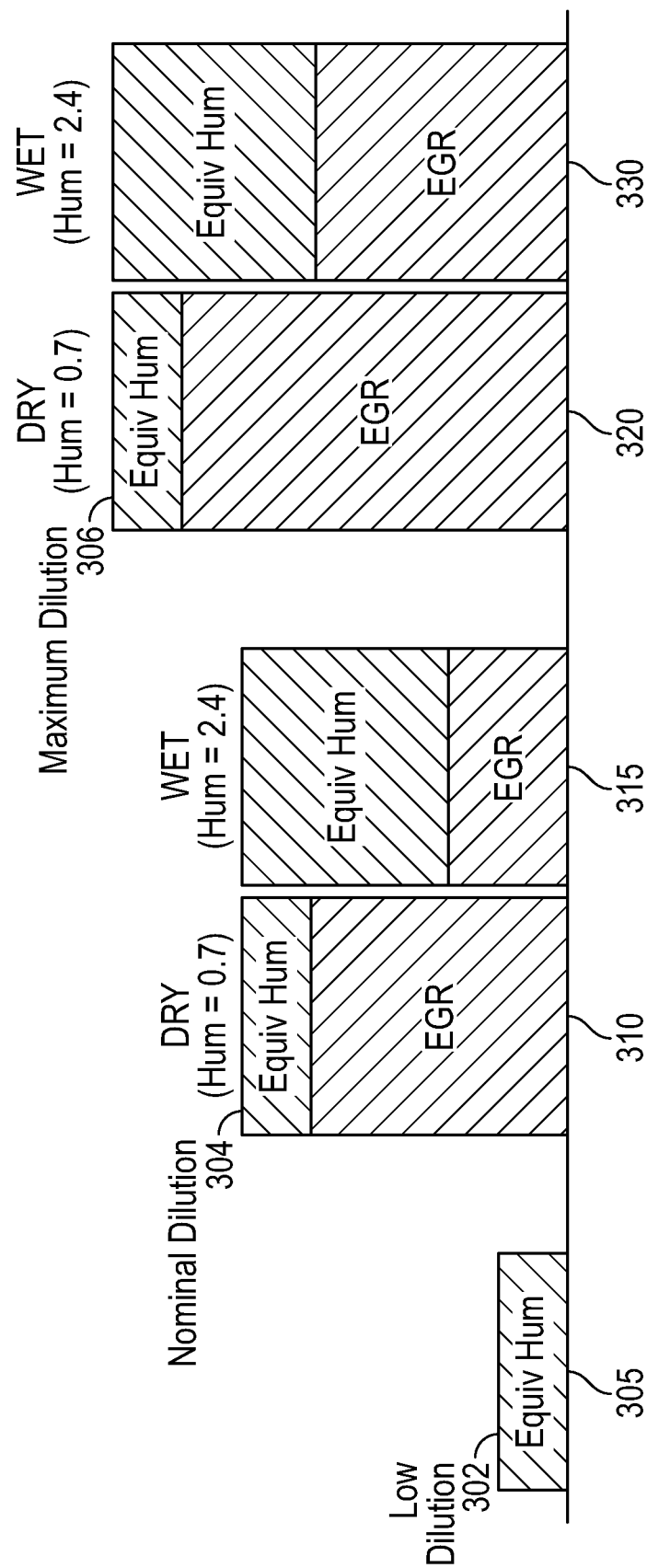
FIG. 3 illustrates an exemplary chart of a set of comparisons between humidity introduced and EGR in control modes for the low, nominal, and maximum dilution values that combines humidity and dilution values in a single dilution value that restricts cam phasers to maximize engine performance, in accordance with various embodiments.

FIG. 3 illustrates an exemplary block chart of a set of comparisons between humidity introduced and EGR in control modes for the low, nominal, and maximum dilution values that combines humidity and dilution values in a single dilution value that restricts cam phasers to maximize engine performance, in accordance with an embodiment. In FIG. 3, for a low dilution value 302, the equivalent humidity is shown as low without any EGR. In a nominal dilution value 304, for a dry condition of a humidity equal to 0.7%, the equivalent humidity to EGR shows a ratio 310 with a high percentage of EGR to equivalent humidity. For the wet condition of humidity equal to 2.4%, the equivalent humidity to EGR ratio 315 shows a lesser amount of percentage of EGR to equivalent humidity.

Likewise for maximum dilution values 306, for a dry condition with a dry value for humidity equal to 0.7%, and a similar ratio 320 of a higher percentage of EGR to the equivalent humidity is shown, and for a wet condition with a wet value of humidity equal to 2.4%, a lesser percentage EGR to humidity with the ratio 330 is (coincidently) presented. The range of allowed cam phasing subsequently is restricted based on the amount of humidity and EGR that is introduced by the combined values of the humidity and EGR levels by the single dilution value shown in FIG. 3. of the low dilution 302, nominal dilution 304, and maximum dilution 306 values.

The single dilution values are calculated using the variables $k_1$ and $k_2$ and added together as follows: Low Dilution=$k_1$*Low Humidity+$k_2$*Zero EGR, Nominal Dilution=$k_1$*High Humidity+$k_2$*Nominal EGR at High Humidity, Max Dilution=$k_1$*High Humidity+$k_2$*Max EGR at High Humidity. Each dilution setpoint has a corresponding set of cam phaser maximum advance and maximum retard constraint tables. A Current Dilution value is calculated ($k_1$*Humidity+$k_2$*EGR) and used to interpolate between the three sets of constraint tables.

In exemplary embodiments, the system via the low, nominal, and maximum dilution values simplifies the effects of humidity and EGR into a single value that enables the multivariable controller (230 of FIG. 2) to restrict cam phasers are to maximize engine performance, stability, and efficiency.

In exemplary embodiments, a multivariable torque controller may be implemented that can allow movement of the airflow actuators, including cams, away from the reference positions to produce the desired torque more optimally. The constraints implemented based on the single dilution values allows for acceptable combustion stability across varying EGR and ambient humidity conditions. The constraints also take into account the humidity and EGR effects on combustion (which are shown by the charts in FIG. 3) to have similar effects on combustion but at different magnitudes. To take into account the different magnitudes, the humidity and EGR effects (as shown in FIG. 3) can be added together by first multiplying humidity and EGR by scaling factors $k_1$ and $k_2$, respectively.

Figure 4:
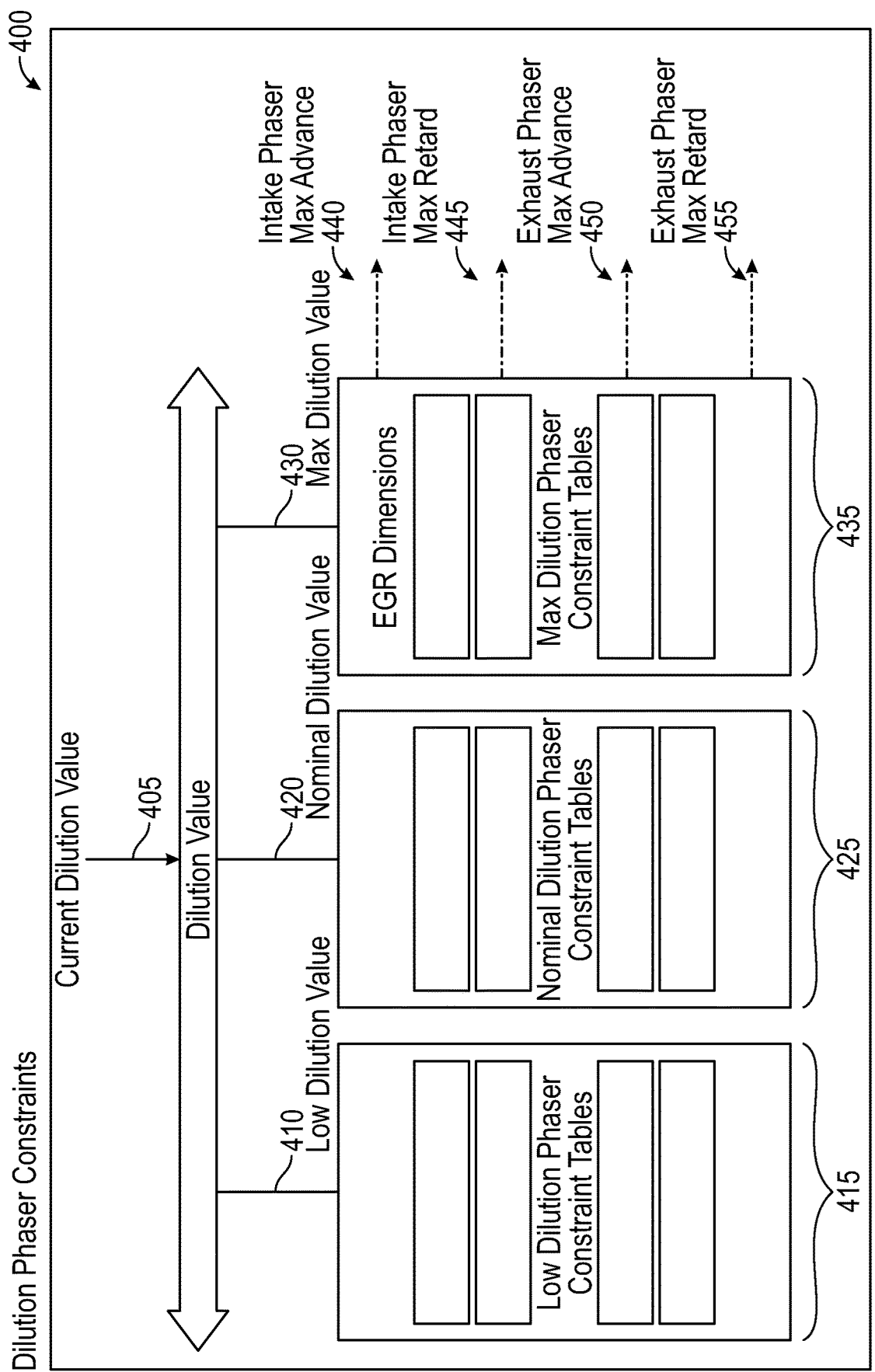
FIG. 4 illustrates an exemplary diagram of the set of calibration tables containing values used to define the three dilution set points for control by the multivariable controller of one or more cam phaser constraints and an EGR valve in accordance with various exemplary embodiments.

FIG. 4 illustrates the calibration tables for cam phaser constraints which correspond to Low Dilution 415, Nominal Dilution 425, and Maximum Dilution 435. Each dilution level has calibration tables for intake phaser maximum advance, intake phaser maximum retard, exhaust phaser maximum advance, and exhaust phaser maximum retard.

The Current Dilution Value 405 is used to interpolate between the dilution values of Low Dilution values 410, Nominal Dilution values 420, and Maximum Dilution values 430 (i.e., the low, nominal, and maximum dilution values are shown in FIG. 3 corresponding to the Low Dilution Value 302, Nominal Dilution Value 304, and Maximum Dilution Value 306) and their respective calibration tables to determine the intake phaser maximum advance constraint 440, the intake phaser maximum retard constraint 445, the exhaust phaser maximum advance constraint 450, and the exhaust phaser maximum retard constraint 455.

In exemplary embodiments, legacy cam phaser control can also be utilized by values of the tables for phaser setpoints under varying conditions.

Figure 5:
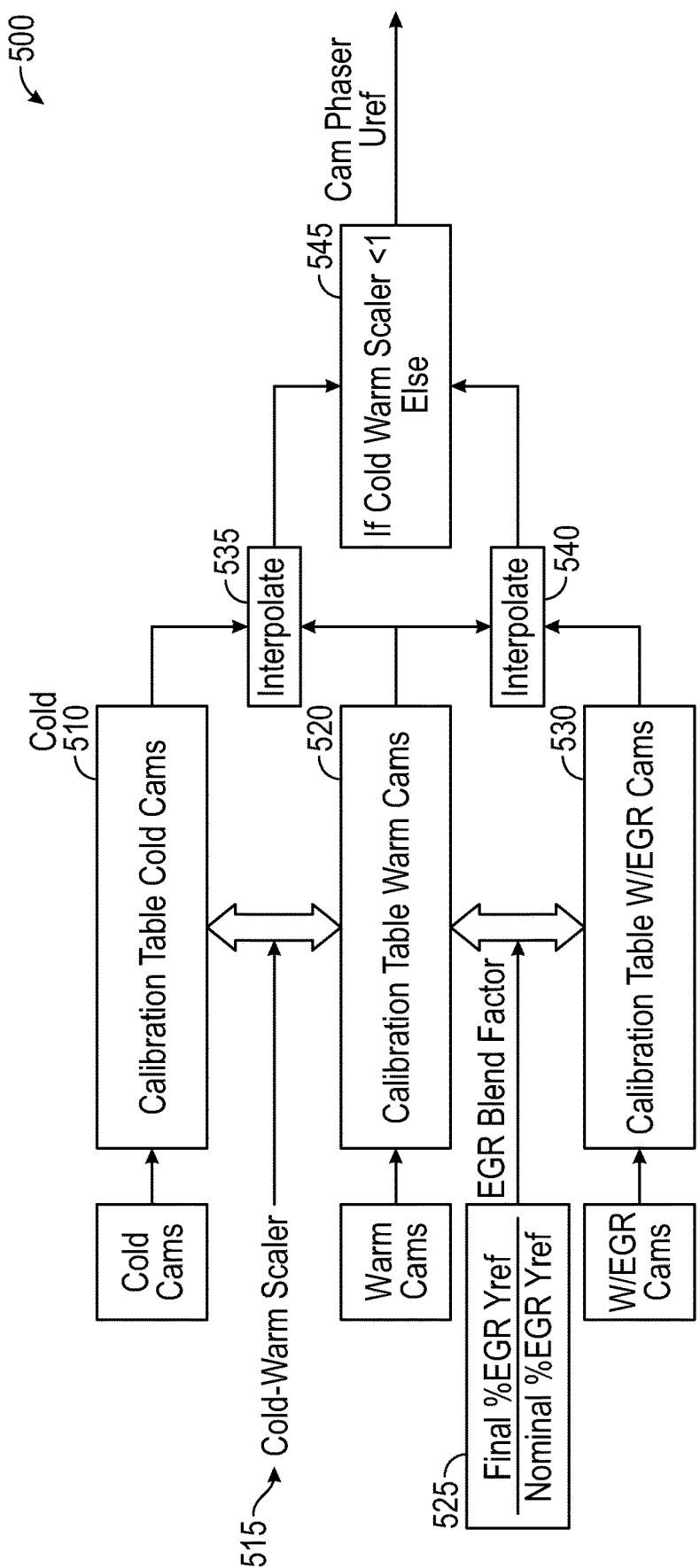
FIG. 5 illustrates an exemplary diagram of the multivariable engine control that has control over one or more cam phasers and an EGR value with three sets of exemplary calibration tables for cam phaser reference values in accordance with various exemplary embodiments.

FIG. 5 illustrates an exemplary diagram of the multivariable engine control that has control over one or more cam phasers and an EGR valve with three sets of exemplary calibration tables for cam phaser reference values in accordance with various embodiments.

In FIG. 5, the multivariable engine control process 500 includes a calibration table 510 of cold cam phaser values, a calibration table 520 of warm cam phaser values, and a calibration table 530 with EGR phaser values. A cold-warm scaler 515 is configured with the engine temperature. An EGR blend factor 525 (i.e., the final percentage value of EGR $Y_{ref}$/nominal percentage value of EGR $Y_{ref}$) is configured after the engine is warmed up. The values from all three calibration tables are interpolated by interpolation functions 535, 540 with respective pairs of values from the cold-warm calibration tables, and the warm-EGR calibration tables used to determine the cam phaser U commands $U_{ref}$ 545 (i.e., cam phaser reference targets).

If the cold-warm scaler 515 has a value less than 1, then the estimation or interpolation used is based on the values from the cold-warm calibration table pair, else it is based on values from the warm-EGR calibration tables. Hence, if the engine is not warmed up, the cold and warm tables are blended to determine cam phaser reference values. The cold-warm blending factor is determined by the engine temperature and calibration tables. In an alternate exemplary embodiment, the cam phasers can be controlled independent of EGR, but the stability and efficiency of the combustion process of the engine may suffer without the EGR considered.

Figure 6:
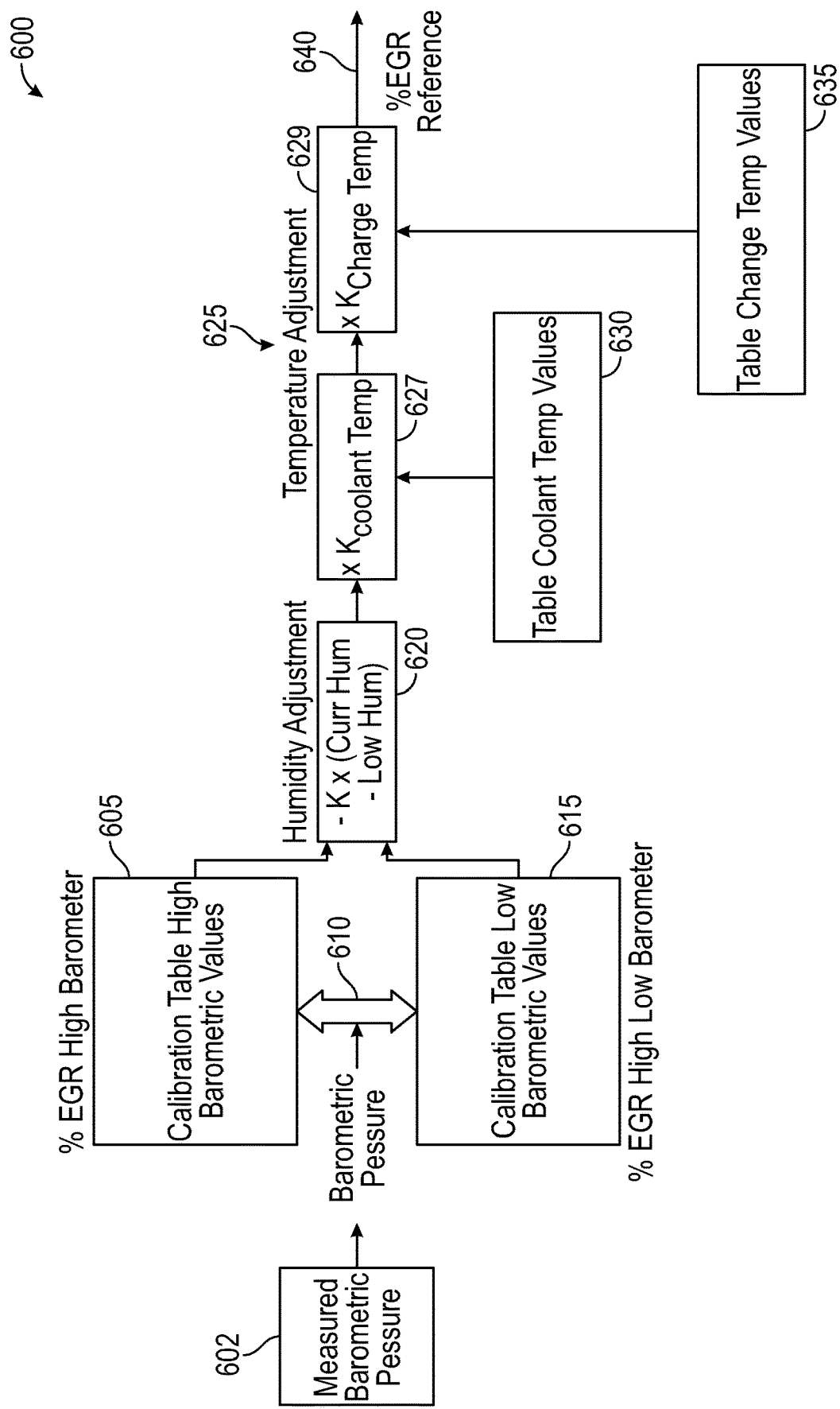
FIG. 6 illustrates an exemplary diagram of a process for calculating the percentage EGR reference value used by the multivariable control system as a target setpoint in accordance with various exemplary embodiments.

FIG. 6 is an exemplary diagram of a process for calculating the percentage EGR reference value used by the multivariable control system as a target setpoint in accordance with various embodiments.

In FIG. 6, the process 600 for the interpolation by the multivariable controller using percentage values of EGR at low and high barometric pressures is shown. In FIG. 6, there is shown, a calibration table 605 containing percentage values of high barometric pressures, and another calibration table 615 containing percentage values of low barometric pressures that adjusted by an interpolation function 610 that provides an interpolated barometric pressure value which is adjusted by an interpolation function 620 for an interpolated humidity value that is subsequently temperature adjusted to generate the percentage value of the EGR reference at the output 640. In embodiments, the values in the calibration tables are base percentage values of EGR references for the low and high barometric pressures, and each value is associated or a function of Revolution Per Minute (RPM) and desired Air Per Cylinder (APC) for the engine. The output 640 is based on the values adjusted for both humidity and temperature.

In embodiments, the values of each of the calibration tables are adjusted by a humidity adjustment by the interpolation function 620 of –k multiplied by the current humidity minus the low humidity value (i.e., –k*(current humidity–low humidity)) that is sent to a temperature adjustment function 625 of multiplying by a coolant temperature value or constant (*$K_{coolanttemp}$) 627 from a table 630, and next multiple by a charge temperature value or constant (*$K_{chargetemp}$) 629 from a table 635 to generate the output 640 of the percentage value of the EGR reference.

The measured barometric pressure 602 is used to interpolate (i.e., the barometric pressure values adjusted by the interpolation function 610 from the low/high calibration table barometric values) a set of values from the low/high barometric calibration tables which is then adjusted for humidity (i.e., the interpolated barometric pressure value is subsequently further interpolated based on a constant value multiplied an amount of current humidity decrease) to determine with a temperature adjustment function 625 applied the initial percentage value of the EGR reference. The percentage value of the EGR reference is adjusted for the current humidity using a linear relationship between humidity and a percentage value in EGR reduction. The humidity adjustment as shown in FIG. 6 is a relatively simple formula to reduce EGR by a coefficient "K" multiplied by the change in humidity. The effects that EGR and humidity have on combustion are similar but different in magnitude. The coefficient "K" can be tuned to maintain constant effective dilution by changing EGR as a function of humidity.

Figure 7:
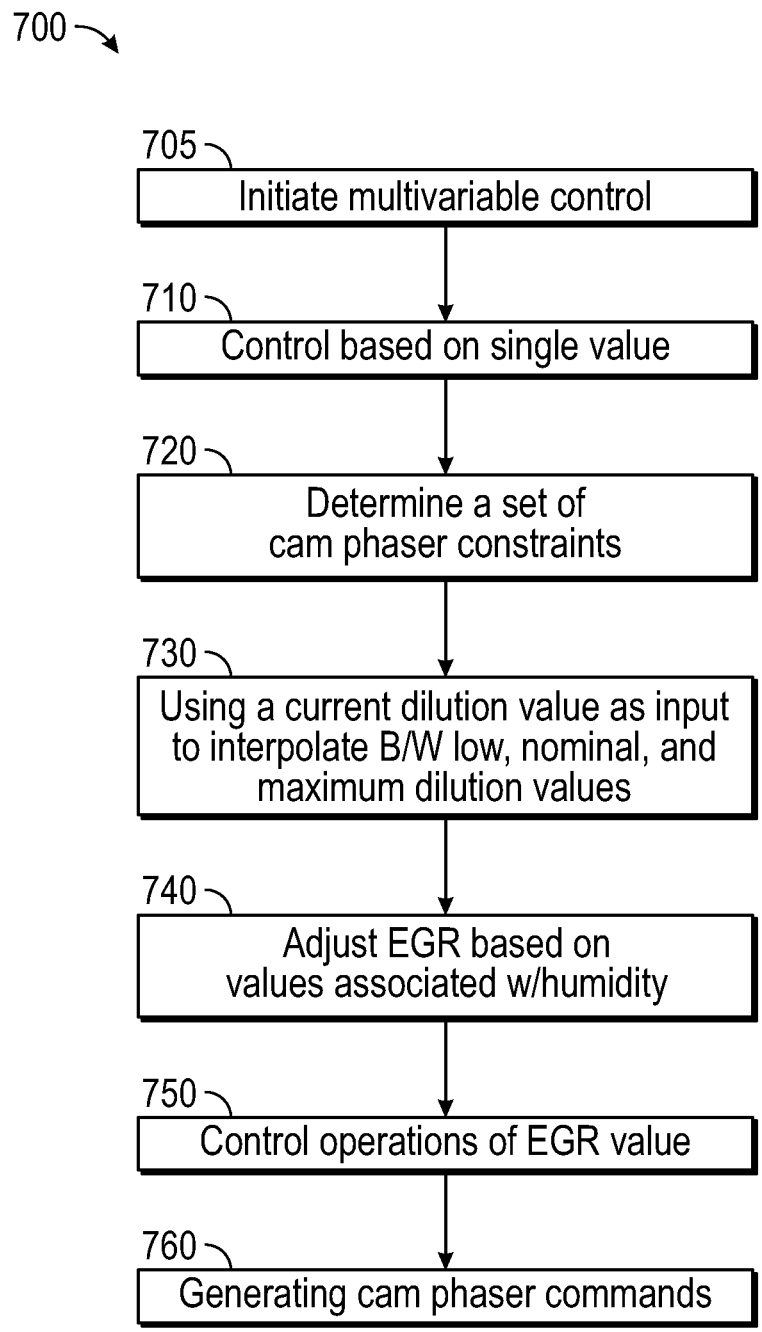
FIG. 7 illustrates an exemplary flowchart of the multivariable torque control of the vehicle described in FIGS. 1-6 of a set of references associated with EGR and constraints for EGR with steps to simply the effects caused by humidity and EGR in a single dilution value for restricting cam phaser operations, in accordance with various exemplary embodiments.

FIG. 7 is an exemplary flowchart of the multivariable torque control of the vehicle described in conjunction with FIGS. 1-6 of a set of references and constraints associated with EGR and cam phasers with steps to simply the effects caused by humidity and EGR in a single dilution value for restricting cam phaser operations, in accordance with various embodiments.

In FIG. 7 at task 705, the process is initiated by a multivariable controller implementing at least one processor that is programmed with a set of instructions to determine a set of references associated with Exhaust Gas Recirculation (EGR).

In exemplary embodiments, the multivariable controller implements an algorithm that uses values of engine temperature and at least one reference that is determined of a set of references associated with the EGR fractions to generate one or more commands for control of a set of actuators. The multivariable controller is configured to optimize at least one cam phase position by control based on a generated command to at least one actuator of the set of actuators and to apply an appropriate level of engine torque for vehicle propulsion. In embodiments, the multivariable controller is configured to apply constraints to optimize cam phase positions associated with EGR valve operations for a set of cams based on amounts of humidity and EGR introduced by the EGR valve during a vehicle operation and provide an amount of propulsion torque by an engine of the vehicle in accordance with instructions provided by the processor.

At task 710, a set of cam phasing is implemented that consist of intake and exhaust cams in combination with external EGR for enhancing the control of an internal combustion engine which are based on a set of instructions in the software to control a processor to simplify a plurality of effects caused by the humidity and EGR during a vehicle phase into a single value for use in generating at least one command to restrict operations of one or more cam phasers. The process includes combining values of the humidity and EGR into a single dilution value, as a basis to schedule the set of cam phaser constraints.

At task 720, the process includes tuning the values of the set of cam phaser constraints by the processor to optimize the engine performance while protecting against poor combustion stability. The value for an EGR reference is based on one or more values contained in a set of calibration tables containing high barometric values and low barometric pressure values which are adjusted by the processor based on a set of values associated with the humidity, engine coolant, and air temperature. The adjustment includes tuning by the processor a coefficient used in adjusting the value of the EGR reference based on the set of values associated with the humidity, the engine coolant, and the air temperature.

At task 730, in the process, a dilution value is generated by the processor by using a current dilution value as an input to interpolate between a set of low, nominal, and maximum dilution values and a corresponding set of calibration tables to determine a set of phaser constraints. The phaser constraints that are determined include an intake phaser maximum advance constraint, an intake phaser maximum retard constraint, an exhaust phaser maximum advance constraint, and an exhaust phaser maximum retard constraint.

At task 740, in the process, in response to a high level of humidity sensed in the operating environment, the processor as instructed reduces an amount of the EGR to maintain a constant value for the dilution value.

At task 750, in the process, control of the EGR amount is performed, by the processor issuing control commands to control operations of the EGR valve based on implementing an algorithm that calculates a percentage value of the EGR reference that is used as the basis for a target setpoint; determining based on the values contained in the set of calibration tables, the percentage value of the EGR reference at low barometric pressure, and high barometric pressure; applying the set of values associated with barometric pressure that is measured and using an interpolate function to determine the set of values from the set of calibration tables on which an initial percentage value of the EGR reference is determined, and adjusting the percentage value of the EGR reference in accordance with a current humidity by using a linear relationship function between the values of the current humidity and the percentage value associated with an EGR reduction.

At task 760, in the process, the processor can be instructed to use a set of cam phaser values from a first, a second, and a third set of cam phaser calibration tables. The tables include a first calibration table containing cold cam phaser values, a second calibration table containing warm cam phaser values, and a third calibration table containing EGR cam phaser values. Then, blend during the engine warmup, a cold-warm scaler blend containing the values between zero to one wherein the values of the cold-warm scaler blend provide the basis to apply the interpolate function between the cold cam phaser values and the warm cam phaser table values. Next, implement another blending operation of blending as EGR is introduced which includes calculating the value for an EGR blend factor by dividing a final percentage EGR reference by a nominal percentage value of the EGR reference that corresponds to the current humidity. The EGR blend factor provides a basis to apply the interpolate function between the warm cam phaser values and the EGR cam phaser values; and generating the set of values as reference target values that correspond to cam phaser commands for providing the amount of propulsion torque by the engine of the vehicle in accordance with further instructions provided by the processor.

Accordingly, methods, systems, and vehicles are provided simplifying the effects of humidity and EGR into a single value to control by constraints or restrictions cam phasers to maximize engine performance, stability, and efficiency of a vehicle.

It will be appreciated that the systems, vehicles, and methods may vary from those depicted in the Figures and described herein. For example, the vehicle 100 of FIG. 1, the control system thereof, and/or components thereof of FIG. 1 may vary in different embodiments. It will similarly be appreciated that the steps of process 700 may differ from those depicted in FIGS. 1-6, and/or that various steps of the process 700 may occur concurrently and/or in a different order than that depicted in FIG. 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for multivariable torque control of a vehicle, the method comprising:
    configuring a processor disposed of in a multivariable controller and programmed with a set of instructions to determine a set of references associated with Exhaust Gas Recirculation (EGR);
    implementing, by the processor, an algorithm based on engine temperature and at least one reference that is determined of the set of references associated with the EGR to generate one or more commands for the control of a set of actuators;
    optimizing, by the processor, at least one cam phase position by the control based on a generated command to at least one actuator of the set of actuators to apply an appropriate level of engine torque for vehicle propulsion;
    restricting, by the processor, an allowable range of cam phases associated with operations of an EGR valve for a set of cams based on amounts of humidity and EGR introduced by the EGR valve during an internal combustion phase of vehicle operation; and
    providing an amount of propulsion torque by an engine of the vehicle in accordance with instructions provided by the processor.

2. The method of claim 1, further comprising:
    using, by the processor, the set of cam phasing comprising intake and exhaust cams in combination with external EGR for enhancing the control of an internal combustion engine; and
    simplifying by the processor a plurality of effects caused by the humidity and EGR into a single value for use in generating at least one command to restrict operations of one or more cam phasers.

3. The method of claim 2, further comprising:
    combining, by the processor, values of the humidity and EGR into a single dilution value, as a basis to schedule the set of cam phaser constraints.

4. The method of claim 3, further comprising:
    tuning, by the processor, the values of the set of cam phaser constraints to optimize the engine performance while protecting against poor combustion stability.

5. The method of claim 4, further comprising:
    wherein a value for an EGR reference is based on one or more values contained in a set of calibration tables of at least a high barometric value and a low barometric pressure value.

6. The method of claim 5, further comprising:
    adjusting, by the processor, the EGR reference based on a set of values associated with the humidity, engine coolant, and air temperature.

7. The method of claim 6, further comprising:
    tuning, by the processor, a coefficient for adjusting the value of the EGR reference based on the set of values associated with the humidity, the engine coolant, and the air temperature.

8. The method of claim 7, further comprising:
    wherein the dilution value further comprises:
    using a current dilution value, by the processor, as an input to interpolate between a set of dilution values comprising low dilution values, nominal dilution values, and maximum dilution values and a corresponding set of calibration tables to determine a set of phaser constraints comprising an intake phaser maximum advance constraint, an intake phaser maximum retard constraint, an exhaust phaser maximum advance constraint, and an exhaust phaser maximum retard constraint.

9. The method of claim 8, further comprising:
    in response to a high level of humidity, reducing, by the processor, an amount of the EGR in order to maintain a constant value for the dilution value.

10. The method of claim 9, further comprising:
    controlling by the processor, operating of the EGR valve by:
    calculating, by the processor, a percentage value of the EGR reference that is used as the basis for a target setpoint;
    determining, by the processor, based on the values contained in the set of calibration tables, the percentage value of the EGR reference at low barometric pressure, and at high barometric pressure;
    applying, by the processor, the set of values associated with barometric pressure that is measured and using an interpolate function to determine the set of values from the set of calibration tables on which an initial percentage value of the EGR reference is determined; and
    adjusting, by the processor, the percentage value of the EGR reference in accordance with a current humidity by using a linear relationship function between the values of the current humidity and the percentage value associated with an EGR reduction.

11. The method of claim 10, further comprising:
    using a set of cam phaser values from a first, a second, and a third set of cam phaser calibration tables comprising a first calibration table containing cold cam phaser values, a second calibration table containing warm cam phaser values, and a third calibration table containing EGR cam phaser values;
    blending during the engine warmup, a cold-warm scaler blend containing the values between zero to one wherein the values of the cold-warm scaler blend provide the basis to apply the interpolate function between the cold cam phaser values and the warm cam phaser table values;
    further blending as EGR is introduced comprising calculating the value for an EGR blend factor by dividing a final percentage EGR reference by a nominal percentage value of the EGR reference that corresponds to the current humidity wherein the EGR blend factor provides a basis to apply the interpolate function between the warm cam phaser values and the EGR cam phaser values; and
    generating the set of values as reference target values that correspond to cam phaser commands for providing the amount of propulsion torque by the engine of the vehicle in accordance with instructions provided by the processor.

12. A system for multivariable torque control of a vehicle, the system comprising:
    an engine; and
    a processor disposed of in a multivariable controller that is coupled to the engine and configured to:
    determine a set of references associated with Exhaust Gas Recirculation (EGR);
    implement an algorithm based on an engine temperature and at least one reference that is determined of the set of references associated with the EGR to generate one or more commands for the control of a set of actuators;
    optimize at least one cam phase position by the control based on a generated command to at least one actuator of the set of actuators to apply an appropriate level of engine torque for vehicle propulsion;

restrict an allowable range of cam phases associated with EGR valve operations for a set of cams based on amounts of humidity and EGR introduced by the EGR valve during an internal combustion phase of vehicle operation; and provide an amount of propulsion torque by the engine of the vehicle in accordance with instructions provided by the processor.

13. The system of claim 12, further comprising:
wherein the processor is further configured to:
use the set of cam phasing comprising intake and exhaust cams in combination with external EGR for enhancing the control of the internal combustion engine; and
simplify a plurality of effects caused by the humidity and EGR into a single value for use to generate at least one command to restrict operations of one or more cam phasers.

14. The system of claim 13, further comprising:
wherein the processor is further configured to:
combine values of the humidity and EGR into a single value for a dilution value, as a basis to schedule the set of cam phaser constraints.

15. The system of claim 14, further comprising:
wherein the processor is further configured to:
tune values of the set of cam phaser constraints to optimize engine performance while protecting against poor combustion stability wherein a value for an EGR reference is based on one or more values contained in a set of calibration tables of at least a high barometric value and a low barometric pressure value.

16. The system of claim 15, further comprising:
wherein the processor is further configured to:
adjust the EGR reference based on a set of values associated with the humidity, engine coolant, and air temperature.

17. The system of claim 16, further comprising:
wherein the processor is further configured to:
use a current dilution value as input to interpolate between a set of dilution values comprising low dilution values, nominal dilution values, and maximum dilution values and a corresponding set of calibration tables to determine a set of phaser constraints comprising an intake phaser maximum advance constraint, an intake phaser maximum retard constraint, an exhaust phaser maximum advance constraint, and an exhaust phaser maximum retard constraint.

18. The system of claim 17, further comprising:
wherein the processor is further configured to:
in response to a high level of humidity, reduce an amount of the EGR in order to maintain a constant value for the dilution value.

19. The system of claim 18, further comprising:
wherein the processor is further configured to:
control the EGR valve by performing a set of actions to:
calculate a percentage value of the EGR reference that is used as the basis for a target setpoint;
determine based on values contained in the set of calibration tables, the percentage value of the EGR reference at low barometric pressure, and at high barometric pressure;
apply the set of values associated with barometric pressure that is measured and use an interpolate function to determine the set of values from the set of calibration tables on which an initial percentage value of the EGR reference is determined; and
adjust the percentage value of the EGR reference in accordance with a current humidity by using a linear relationship function between the values of the current humidity and the percentage value associated with an EGR reduction.

20. The system of claim 19, further comprising:
wherein the processor is further configured to:
use a set of cam phaser values from a first, a second, and a third set of cam phaser calibration tables comprising a first calibration table containing cold cam phaser values, a second calibration table containing warm cam phaser values, and a third calibration table containing EGR cam phaser values;
blend during the engine warmup, a cold-warm scaler blend containing values between zero to one wherein the values of the cold-warm scaler blend provide the basis to apply the interpolate function between the cold cam phaser values and the warm cam phaser table values;
further blend as EGR is introduced comprising calculating the value for an EGR blend factor by dividing a final percentage EGR reference by a nominal percentage value of the EGR reference that corresponds to the current humidity wherein the EGR blend factor provides a basis to apply the interpolate function between the warm cam phaser values and the EGR cam phaser values; and
generate the set of values as reference target values that correspond to cam phaser commands for providing the amount of propulsion torque by the engine of the vehicle.

* * * * *